(12) United States Patent
Sviberg et al.

(10) Patent No.: US 12,509,000 B2
(45) Date of Patent: Dec. 30, 2025

(54) ROOF MODULE HAVING A TRANSMITTER AND/OR RECEIVER APPARATUS

(71) Applicant: Webasto SE, Stockdorf (DE)

(72) Inventors: Magnus Sviberg, Stockdorf (DE);
Maximilian Ehrmann, Stockdorf (DE);
Cèdric Langlais, Stockdorf (DE);
Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 377 days.

(21) Appl. No.: 18/167,417

(22) Filed: Feb. 10, 2023

(65) Prior Publication Data
US 2023/0256916 A1 Aug. 17, 2023

(30) Foreign Application Priority Data
Feb. 17, 2022 (DE) ...................... 10 2022 103 830.0

(51) Int. Cl.
*B60R 11/04* (2006.01)
*B62D 25/06* (2006.01)
(Continued)

(52) U.S. Cl.
CPC .............. *B60R 11/04* (2013.01); *B62D 25/06* (2013.01); *G01S 13/931* (2013.01);
(Continued)

(58) Field of Classification Search
CPC ................ B60R 11/04; B60R 11/0258; B60R 2300/108; B62D 25/06; H04N 23/51; G01S 7/481; G01S 7/4813; G01S 2013/93273; G01S 13/931; G01S 17/931; G05D 1/0231; G05D 1/0246; G05D 1/0248; G05D 1/0251; G05D 1/0253; G05D 1/0257
(Continued)

(56) References Cited

U.S. PATENT DOCUMENTS 6,592,176 B2 * 7/2003 Lumpe ...................... B60R 9/04
296/210
11,922,920 B2 * 3/2024 Huelsen .............. B60W 60/001
(Continued)

FOREIGN PATENT DOCUMENTS

DE 102019122168 B3 2/2021
DE 102019122193 B4 3/2021
(Continued)

OTHER PUBLICATIONS

Office Action issued in corresponding Chinese Application No. 202310130181.9 ; mailed Jun. 26, 2025; In Chinese with English machine translation (22 pages).

*Primary Examiner* — Dennis H Pedder
(74) *Attorney, Agent, or Firm* — Fitch, Even, Tabin & Flannery, LLP

(57) ABSTRACT

A roof module having a panel component which forms at least sections of a roof cladding of a vehicle roof, which functions as an outer sealing surface of the roof module, and has a viewing area, wherein at least one transmitter and/or receiver apparatus of an environment sensor is disposed directly and without gaps at the viewing area and/or the panel component or is integrated therein and is configured to transmit and/or receive electromagnetic and/or optical signals directly via the viewing area and/or the panel component.

7 Claims, 5 Drawing Sheets

(51) Int. Cl.
  *G01S 13/931* (2020.01)
  *G01S 17/931* (2020.01)
  *H04N 23/51* (2023.01)
  *B60R 11/00* (2006.01)

(52) U.S. Cl.
  CPC .......... *G01S 17/931* (2020.01); *H04N 23/51* (2023.01); *B60R 2011/0043* (2013.01)

(58) Field of Classification Search
  USPC ........................................................ 296/210
  See application file for complete search history.

(56) References Cited

U.S. PATENT DOCUMENTS

| | | |
|---|---|---|
| 2016/0236725 A1* | 8/2016 | Shirai .................. B62D 29/008 |
| 2019/0176717 A1 | 6/2019 | Gomes et al. |
| 2021/0237694 A1 | 8/2021 | Hirschvogel et al. |
| 2022/0169314 A1 | 6/2022 | Huelsen et al. |
| 2022/0348149 A1 | 11/2022 | Huelsen |

FOREIGN PATENT DOCUMENTS

| | | |
|---|---|---|
| DE | 102020102643 A1 | 8/2021 |
| DE | 102020125410 B3 | 1/2022 |

\* cited by examiner (State of the Art)

(State of the Art)

(State of the Art)

(State of the Art)

ROOF MODULE HAVING A TRANSMITTER AND/OR RECEIVER APPARATUS

CROSS-REFERENCE TO RELATED APPLICATION

This application claims priority from German Patent Application Number DE 10 2022 103 830.0, filed Feb. 17, 2022, which is hereby incorporated herein by reference in its entirety for all purposes.

FIELD

The invention relates to a roof module for forming a vehicle roof of a motor vehicle according to the preamble of claim 1. Furthermore, the invention relates to a roof module for forming a vehicle roof of a motor vehicle according to the preamble of claim 2.

BACKGROUND

Generic roof modules are known from the state of the art. A generic roof module, which forms a vehicle roof of the motor vehicle on which it is disposed, is pre-manufactured as a separate functional module and can be provided directly at the assembly belt for the purpose of assembly. The roof module forms at least sections of a roof cladding of the vehicle roof on its outer face, which prevents humidity and/or air currents from entering the vehicle interior. The roof cladding is formed by one or more panel components which can be made of a stable material, such as coated sheet metal or coated or solid-colored plastic. The roof module can be a part of a rigid vehicle roof or a part of a roof component group which can be opened.

Furthermore, the development in vehicle manufacturing is focused more and more on autonomous or partially-autonomous motor vehicles. To grant the vehicle control system autonomous or partially autonomous control of the motor vehicle, a plurality of electric, electronic and/or electromagnetic components are necessary which are extensively installed in the entire motor vehicle. Components of this kind can be, for example, environment sensor (e.g., lidar sensors, radar sensors, cameras, multi-cameras, etc. including further (electric) components), which are configured for charting the environment around the motor vehicle and to determine a corresponding situation in traffic, for example, from the charted environment data.

Furthermore, roof modules are known from the state of art which comprise a plurality of environment sensors to chart a vehicle environment as comprehensively as possible. Roof modules of this kind are referred to as roof sensor modules (RSM). The known environment sensors transmit and/or receive electromagnetic signals, such as laser beams or radar beams, a signal evaluation allowing to generate a data model of the vehicle environment which can be used for the vehicle control system.

From the state of the art, several manners of arranging environment sensors on the roof modules are known. It is known from DE 10 2019 122 193 B4, for example, to position environment sensors on a frame of a roof module, via which the roof module is mounted on a vehicle-roof frame of the vehicle chassis. In most instances, panel components engage over or cover environment sensor of this kind, the environment sensors each looking through a viewing area intended on the panel component. Furthermore, DE 10 2020 102 643 A1 discloses equipping a roof module with an environment sensor which is mounted displaceably on the roof module between a resting position and a usage position.

For these known manners of arranging environment sensors in roof modules exists a set of problems due to a limited installation space available in the roof area which is said to negatively impact a styling and design of the roof module in question due to the arrangement of an environment sensor. Moreover, it is not possible to optimize a packaging in the roof area. Equally, the solutions regarding a total weight and regarding the production costs are also disadvantageous.

For the known manners of fixing environment sensors exists another set of problems which requires the environment sensors to look through several viewing areas, in particular windows or lenses, for charting the vehicle environment. Hence, for example, a window and/or lens is provided in a casing of the environment sensor out of which the environment sensor looks. This casing is disposed on roof-module frame, for example, and covered by the panel component. In the panel component, another viewing area is provided, in particular a window and/or a lens. The environment sensor is disposed in such a manner in the state of the art that it looks out of both or several viewing areas to chart the vehicle environment. Consequently, the electromagnetic rays and/or optic signals transmitted and/or received by the environment sensor have to pass through several windows and/or lenses in order to chart the vehicle environment. This leads to optical losses which increase with each passing through every viewing area. Moreover, the several viewing areas switched downstream of each other can cause an optical offset and/or optical blurs which negatively impact the measuring accuracy of the environment sensor. In other words, the sight of the environment sensor deteriorates.

To circumvent this problem, it has been known to fasten an environment sensor including its casing in an opening of the panel component by the casing being inserted into this opening, for example. In this case, the casing has a viewing area, meaning the environment sensor looks through only this viewing area. However, this solution carries significant problems regarding water tightness as the opening provided in the panel component has to be sealed all around to prevent water from entering an interior of the roof module. The used seals require maintenance, can become brittle and fissured due to exposure to the sun and also result in a negative optical appearance. Moreover, the alternative solution is further disadvantageous at least with regard to production costs.

SUMMARY

The object of the invention is therefore to propose a roof module which avoids the disadvantages of the known state of the art described above and reduces in particular optical losses and/or charting losses of an environment sensor and/or solves the set of problems revolving around providing water tightness.

The object is attained by a roof module according to the teachings of claim 1. Alternatively, the object is attained by a roof module according to the teachings of claim 2. Furthermore, the object is attained by a motor vehicle having an embodiment of a roof module according to the invention.

Advantageous embodiments of the invention are the subject matter of the dependent claims. Moreover, all combinations of at least two of the features disclosed in the description, the claims and/or the figures pertain to the scope of the invention. Naturally, the embodiments mentioned in reference to the roof module pertain equally to the motor vehicle according to the invention, without having to be mentioned separately.

According to a first aspect, the roof module according to the invention comprises a panel component which forms at least sections of a roof cladding of a vehicle roof, which functions as an outer sealing surface of the roof module, and has a viewing area. The roof module is characterized in that at least one transmitter and/or receiver apparatus of an environment sensor is disposed directly and without gaps at the viewing area and/or the panel component or is integrated therein. The transmitter and/or receiver apparatus is configured to transmit and/or receive electromagnetic and/or optical signals directly via the viewing area and/or the panel component. According to this aspect, the at least one transmitter and/or receiver apparatus is preferably disposed in such a manner at the viewing area and/or the panel component that it is in direct contact with a surface of the viewing area and/or the panel component directed towards an interior of the roof module. In other words, the transmitter and/or receiver apparatus is preferably affixed at an inner surface of the viewing area or is directly integrated at or in the viewing area. Particularly preferably, the transmitter and/or receiver apparatus is glued and/or screwed and/or directly connected in any manner, in particular without any further intermediate components, to the viewing area and/or the panel component, in particular to the surface of the viewing area and/or the panel component directed towards the interior of the roof module. Alternatively, the transmitter and/or receiver apparatus can be integrated, e.g., embedded and/or molded and/or injection-molded, in the viewing area and/or the panel component. The viewing area can be made of, for example, a plastic or glass or any other material transparent to the transmitter and/or receiver apparatus. The viewing area can preferably have optical filtering properties, via which, in particular selectively, predetermined wavelengths cannot pass through the viewing area, meaning the viewing area is opaque and/or impermeable for this kind of predetermined wavelengths. Alternatively or additionally, the transmitter and/or receiver apparatus can be integrated in the panel component, which is preferably made of a material preferably transparent for the electromagnetic signals used for the transmitter and/or receiver apparatus. Thus, the transmitter and/or receiver apparatus can also be comprised in a wall section of the panel component, for example. In the event that the transmitter and/or receiver apparatus is disposed at the panel component or is integrated therein, the panel component is preferably made of a material which is permeable, in particular transparent, for the electromagnetic radiation used by the transmitter and/or receiver apparatus. The transmitter and/or receiver apparatus is preferably disposed at or integrated in a predetermined area of the panel component and/or the viewing area.

According to a second aspect, the roof module according to the invention comprises a panel component which forms at least sections of a roof cladding of a vehicle roof, which functions as an outer sealing surface of the roof module, and has a viewing area. The roof module is characterized in that at least one transmitter and/or receiver apparatus of an environment sensor is disposed in a casing free of walls in the direction of the viewing area and is connected to the panel component and is configured to transmit and/or receive electromagnetic and/or optical signals via the viewing area and/or the panel component and an air gap between the viewing area and the at least one transmitter and/or receiver apparatus. According to this aspect, the transmitter and/or receiver apparatus is disposed indirectly, i.e., via the casing, at the viewing area and/or the panel component. The transmitter and/or receiver apparatus is preferably disposed at or in the casing or is comprised thereby. The casing is preferably disposed and/or provided in such a manner on the panel component that the transmitter and/or receiver apparatus is oriented in such a manner in the casing that it can look through the viewing area and/or the panel component without hindrance. The casing is preferably disposed at the panel component in an area around the viewing area and/or is connected and/or made in one piece therewith. The transmitter and/or receiver apparatus is preferably disposed in or at the casing that the transmitted and/or received electromagnetic signals and/or optical signals pass through the viewing area and/or the panel component and through the air gap formed between the transmitter and/or receiver apparatus and the surface of the viewing area directed towards the interior of the roof module in order to be transmitted in the vehicle environment and/or to be received from there.

According to the first and second aspect, it becomes possible to improve a styling and design of the roof module in question via the arrangement of the at least one transmitter and/or receiver apparatus as intended by the invention with respect to the state of the art.

Moreover, the invention allows optimizing a packaging in the roof area. Thus, the total weight can be optimized and reduced and the production costs can be reduced. According to the invention, it is possible to provide a larger extent of design liberties for a layout and styling of the roof module. Equally, the set of problems revolving around sealing is also solved by the invention, as a plug solution, as is known from the state of the art, can be omitted.

According to the invention, the available installation space is moreover enlarged for a vehicle interior and/or for other roof-module components, such as a panoramic roof and/or a sun roof, as preferably merely the transmitter and/or receiver apparatus of the environment sensor can be disposed in an edge area of the roof module in an installation space intended therefor. The remaining components of the environment sensor, such as control and/or evaluation electronics and/or a camera control unit (CCU) and/or an image pre-processing apparatus and/or an image processing device, in contrast can be disposed particularly preferably in other areas of the roof module and/or the motor vehicle, in which a larger installation space is available than is the case for the roof module. This allows limiting the installation space to be provided in the roof module for transmitting and/or receiving electromagnetic and/or optical environment signals for charting the vehicle environment to a minimal size, as in the best case scenario, merely the transmitter and/or receiver apparatus can be disposed in the roof module, in particular spatially distanced to other sensor components. In other words, it is therefore possible for merely the transmitter and/or receiver apparatus to be indirectly or directly disposed at the viewing area or be disposed therein and to be, in particular communicatively, connected to other electric and/or electronic and/or electromagnetic components of the environment sensor via one or more cables or without cables. In this manner, the electromagnetic signals can be received from the vehicle environment in the field of vision of the environment sensor and/or be transmitted to the vehicle environment via the transmitter and/or receiver apparatus, an electric signal flow preferably taking place via the one or more cables or without cables. The field of view of the environment sensor is preferably defined via the type and size of the transmitter and/or receiver apparatus and/or via the design of the viewing area, for example by choosing a lens which forms the viewing area. Particularly preferably, several transmitter and/or receiver apparatus can be disposed in the roof module. From each of the several transmitter and/or receiver apparatuses, preferably one or more cables lead to other components of an environment sensor. According to the invention, it is particularly preferably possible to use the other components, such as control and evaluation electronics and/or a camera control unit (CCU) and/or an image pre-processing apparatus and/or an image processing apparatus together, i.e., for the plurality of the transmitter and/or receiver apparatuses. Thus, in other words, the signals registered and/or transmitted by the plurality of transmitter and/or receiver apparatuses can be processed and/or evaluated via centralized components. Consequently, it is no longer necessary to associate all components required for an environment sensor for one functionality to each transmitter and/or receiver apparatus. This can reduce costs, weight and required installation space. Moreover, this makes it possible to dispose the transmitter and/or receiver apparatuses in nearly any position on the roof module, as the individual transmitter and/or receiver apparatuses require almost no installation space with respect to a generic environment sensor.

In other words, the invention makes it possible in particular via the arrangement of the at least one transmitter and/or receiver apparatus to improve the positioning of the environment sensor and/or the environment sensors, as different sensor components can be disposed, in particular spatially distanced from each other, depending on the available installation space within the roof module and/or a vehicle chassis. In contrast to the state of the art, the environment sensor is therefore no longer viewed as a component according to the invention, which would have to be inserted into a uniform installation space intended therefor, the environment sensor instead being able to be disposed across the roof module and/or the motor vehicle in different available installation spaces by being divided into individual sensor components, meaning space can be used optimally. Moreover, redundancies regarding individual sensor components can be omitted, as individual sensor components (see above) can preferably be centralized. This allows optimizing, among other things, a field of view (FOV), which increases an overall safety of the vehicle. According to the invention, arranging or integrating the at least one transmitter and/or receiver apparatus at or in the viewing area makes it possible to forego some other components, such as a deicing device, as a thermal performance of the at least one transmitter and/or receiver apparatus can be used to keep the viewing area, in particular a window and/or a lens, free of snow, ice and/or fog. Consequently, by affixing the at least one transmitter and/or receiver apparatus, a deicing and/or defogging function can be provided. If the at least one transmitter and/or receiver apparatus is disposed in the casing, a deicing and/or defogging function of this kind can be preferably provided via trapped heat within the casing, via which the viewing area is heated on the inside.

The phrase "at least a/one" expresses that the roof module according to the invention can comprise one or more of the components in question. It is also understood that the roof module can comprise several transmitter and/or receiver apparatuses according to other embodiments. Furthermore, it is obvious that the panel component can comprise several viewing areas separate from each other, each viewing area preferably being associated with at least one transmitter and/or receiver apparatuses. Equally, the panel component can have at least one viewing area which is sized such that several transmitter and/or receiver apparatuses can look through there.

The roof module according to the invention can form a component in which apparatuses, such as the at least one environment sensor, are integrated for autonomous or partially autonomous driving or driver assisted driving and which can be attached to a vehicle shell as a unit by a vehicle producer. Furthermore, the roof module according to the invention can be designed as a mere rigid roof or as a roof including a roof opening system. Moreover, the roof module can be designed for being used in a passenger vehicle or a commercial vehicle.

According to a preferred embodiment, the at least one transmitter and/or receiver apparatus comprises an imaging sensor, in particular a silicon sensor and/or a radar sensor. The imaging sensor is preferably a device for recording two-dimensional images of light in an electrical and/or mechanical manner. Preferably, semiconductor-based image sensors are used, which can record light to the medium infrared range. There are two-dimensional semiconductor detectors for recording high-energy ionizing beam types like x-ray beams and gamma rays. Particularly preferably, image sensors comprise a two-dimensional array, whose signals are read out electronically. In other words, an image sensor is preferably a flat, thin component like a circuit board. A component of this kind can be disposed particularly preferably directly at the viewing area or be integrated therein, as nearly no installation space must be made available for a component of this kind. In particular when evaluating infrared rays, this array is referred to as focal plane array (FPA). Silicon sensors can be CCD sensors, Bayer filters or active-pixel sensors, for example.

According to a preferred embodiment, the casing defines a casing section which is free of walls in the direction of the viewing area and is disposed at, in particular glued and/or screwed and/or bolted and/or welded and/or soldered to, the panel component. Consequently, the casing does not have its own walls in the direction of the viewing area, but rather is closed by the viewing area. The casing can comprise, for example, only a carrier element, on which at least the transmitter and/or receiver apparatus is disposed; in other words, it consequently does not have to be entirely closed. The casing can instead be only a partial casing and/or a casing section. It is also understood that besides the transmitter and/or receiver apparatus, at least one other electric and/or electronic and/or electromagnetic component of the environment sensor, in particular control electronics and/or evaluation electronics and/or image processing electronics and/or image pre-processing electronics and/or at least one cable and/or a communication module, can also be disposed at or in the casing. Thus, the environment sensor can be disposed in its entirety in the casing as a self-contained functioning unit. According to the invention, however, it is preferred if only the transmitter and/or receiver apparatus is disposed in the casing, in particular spatially distanced from the other sensor components, as an optimization of the installation space is attainable in this manner. Which material the casing is made of is generally arbitrary. Particularly preferably, the casing is self-contained in a state disposed on the panel component and forms a dry area in this manner, in which at least the transmitter and/or receiver apparatus of the environment sensor and/or at least an antenna and/or at least an illumination apparatus and/or at least a switch and/or at least a valve and/or at least a control unit can be disposed, in particular to be protected against humidity.

According to a preferred embodiment, the casing is connected in one piece with the panel component. The casing therefore is preferably formed integrally on the panel component. This can take place by means of a deep drawing method or die casting method. In other words, the casing is made of the same material as the panel in one piece therewith. The casing is therefore made together with the panel component. This has the advantage that an additional assembly for affixing a separate casing is not required. Moreover, it is possible to form a dry area for affixing at least one of the components mentioned above, without a sealing having to take place for this purpose. Indeed, the seal is already provided via the integral design. Thus, the integration of the casing in the panel component allows foregoing some of the components or they can be integrated in other components. This enables a functional and/or partial integration. This has a positive effect on production costs and the total weight.

According to a preferred embodiment, the viewing area is embedded and/or inserted in the panel component or is formed, in particular integrally, by the panel component. Particularly preferably, the viewing area comprises at least one lens or at least one window. Particularly preferably, the viewing area is designed integrally with the panel component. This can be attained, for example, by the panel component being made of a plastic or glass and corresponding to the required transparency properties at least in the area of the viewing area, consequently being transparent for the wavelengths processable by the transmitter and/or receiver apparatus. Particularly preferably, the viewing area can be designed as a lens. This lens can preferably have a convex curve which is directed towards a vehicle environment and through which, among other things, a field of view (FOV) of the environment sensor can be influenced. The lens can be formed integrally with the panel component by a material thickness being formed in the area of the viewing area, for example, the material thickness being able to be cut in another step, for example, in order to produce the optical properties of the lens.

According to a preferred embodiment, the environment sensor comprises a lidar sensor and/or a radar sensor and/or a camera sensor and/or a multi-camera sensor and/or an ultrasound sensor. Generally, the environment sensor according to the invention can be designed in many different manners and comprise a lidar sensor, a radar sensor, an optical sensor, such as a camera or a multi-camera, an ultrasonic sensor and/or the like. Lidar sensors function in a wavelength of 905 nm or even approximately 1550 nm, for example. A material in a viewing area of the environment sensor is preferably transparent for a wavelength range used by the environment sensor and is chosen in view of the wavelength(s) used by the environment sensor. It is understood that merely one transmitter and/or receiver apparatus, e.g., an image sensor and/or a photo chip, can be provided. Separately from this, evaluation electronics, in particular referred to as a camera control unit (CCU), for example, can be disposed in an area of the roof module and/or the motor vehicle, which is configured to evaluate signals registered by the image sensor.

According to a preferred embodiment, the panel component comprises at least one electric, electronic and/or electromagnetic component. It is clear that the invention allows disposing the at least one electric, electronic and/or electromagnetic component directly or indirectly at the panel component alternatively or additionally to the transmitter and/or receiver apparatus of the environment sensor. Consequently, according to the invention, roof modules are also conceivable in which the at least one component is intended as an alternative or in addition to the transmitter and/or receiver apparatus of the environment sensor. In other words, at least one electric, electronic and/or electromagnetic component can be disposed directly, in particular without interconnecting further components, or indirectly, in particular via other components and/or via a casing, at the panel component. The at least one component can, for example, be comprised in the casing, which in turn is disposed at the panel component or is formed integrally therewith. The at least one component can comprise at least one antenna and/or at least one measuring sensor and/or at least one communication apparatus and/or at least one illumination apparatus. It is obvious that the component can also comprise several of the previously mentioned components in each case. The antenna can be an electric or magnetic antenna. The measuring sensor can be a temperature sensor, a humidity sensor, a GPS sensor, an acceleration sensor and/or a comparable measuring sensor, for example. The communication apparatus can be a WiFi interface, an LTE interface or any kind of short, medium or long-range communication interface. Via the communication apparatus, the motor vehicle is configured to communicate with a vehicle environment and in particular to transmit and/or receive data. The illumination sensor can comprise one or more illuminants. The illuminants are in particular designed to display a partially automated and/or autonomous driving operation and/or different driving operation situations of the motor vehicle.

According to a preferred embodiment, the roof module is disposed as a component on a roof frame of the vehicle chassis. This arrangement of the roof module on the roof frame can preferably take place via an adhesive connection, a screw connection and/or a welt connection. For this purpose, the roof module can have a roof module frame or merely be disposed at or on the roof frame via the panel component, i.e., without a roof-frame module.

The invention further relates to a vehicle having a vehicle chassis, on which at least one roof module is disposed according to one of its embodiments. It is clear that according to the invention, the motor vehicle can comprise several roof modules which form at least sections of a roof cladding of the motor vehicle and/or which are disposed at least in a roof area of the vehicle, for example in an area of the longitudinal beam and/or a transverse beam of a roof frame of the motor vehicle. Roof modules of this kind according to the invention can, for example, cover merely a section of the vehicle roof. Roof modules of this kind thus do not form a continuous roof cladding or a continuous vehicle roof of the motor vehicle.

It is clear the embodiments and exemplary embodiments mentioned above and to be described in more detail below cannot only be realized individually but in any combination with each other, without leaving the scope of the invention at hand behind. Equally, it is clear that the embodiments and exemplary embodiments mentioned above and to be described in more detail below equally or at least similarly refer to the roof module according to the invention, without having to be explicitly mentioned.

BRIEF DESCRIPTIONS OF THE DRAWINGS

Embodiments of the invention are schematically shown in the drawings and are described in more detail in the following.

DETAILED DESCRIPTION

Figure 1:
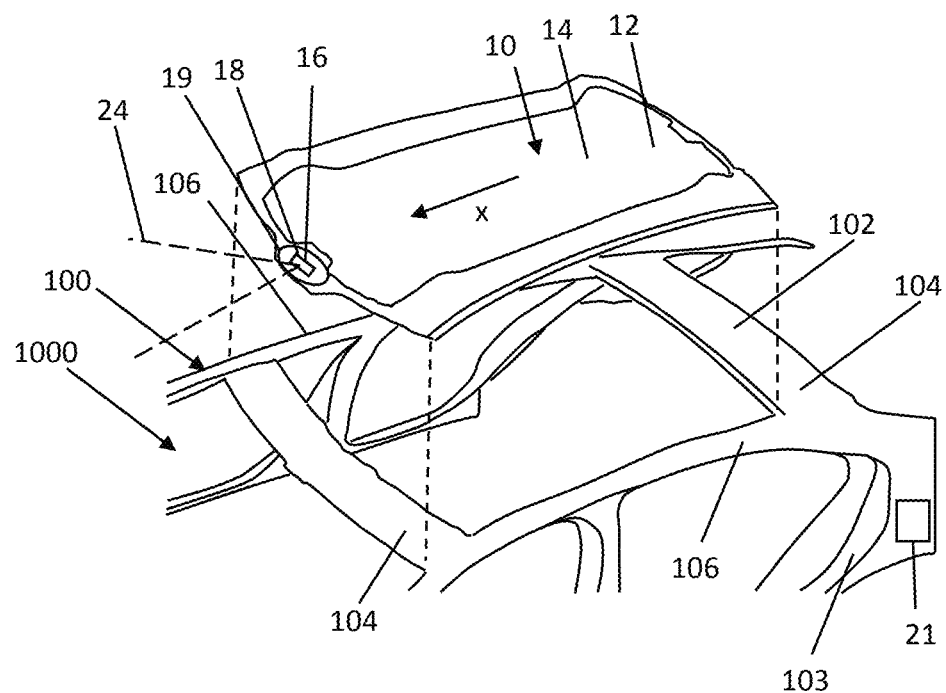
FIG. 1 shows a schematic view of a motor vehicle having a vehicle chassis and a roof module.

In FIG. 1, a motor vehicle 1000 having a vehicle roof 100 is shown. Vehicle roof 100 in the present instance is formed via a roof module 10. Roof module 10 can top off a roof frame 102 of a vehicle chassis 103 as a component. This topping off is in the present instance schematically indicated in the form of dashes. Roof module 10 comprises a panel component 12 for forming a roof cladding 14 of vehicle roof 100. A front transverse beam 104 forms a front header of vehicle 1000. Front transverse beam 104 together with a rear transverse beam 104 and two lateral beams 106 form roof frame 102.

In a frontal, central roof area of roof module 10, as viewed in a longitudinal vehicle direction x, a transmitter and/or receiver apparatus 16 of an environment sensor 18 is disposed directly and without gaps at panel component 12. Transmitter and/or receiver apparatus 16 is configured to transmit and/or receive electromagnetic and/or optical signals 24 directly via a viewing area 19. Viewing area 19 is transparent for the signals processed by transmitter and/or receiver apparatus 16. In the present case, viewing area 19 is also transparent for visible wavelengths, meaning transmitter and/or receiver apparatus 16 can be seen through viewing area 19. Viewing area 19 is presently designed as a lens. In the case of FIG. 1, transmitter and/or receiver apparatus 16 is glued onto a surface of viewing area 19 oriented towards an interior of roof module 10. Alternatively, it is also possible to integrate transmitter and/or receiver apparatus 16 in the viewing area, for example via cast molding. Transmitter and/or receiver apparatus 16 is presently an image sensor or a photo chip. Further technical components 21 of environment sensor 18, in particular an image processing apparatus or an evaluation apparatus, are disposed in an installation space in a rear area of a wheel guard or a fender of vehicle chassis 103 in the present instance, which is shown in the form of a box in a strongly simplified manner. Transmitter and/or receiver apparatus 16 is communicatively connected to other components 21 via a cable harness 22, i.e., via several cables, in the present instance. Cable harness 22 is preferably guided to other components 21 along the vehicle chassis or along roof frame 102.

In the present case, vehicle sensor 18 is a lidar sensor. Other sensor types, such as (multidirectional) cameras and/or ultrasonic sensors, can be used. Environment sensor 18 is configured to transmit and/or receive electromagnetic signals 24 in order to chart a vehicle environment of vehicle 1000 (for example for autonomous driving or for parking) in this manner.

In an alternative embodiment of the invention, transmitter and/or receiver apparatus 16 can be disposed at a casing 20 (see FIGS. 2 to 5). In this case, at least two different types of casings are conceivable. Casing 20 can, however, also be a partial casing or a casing section.

Figure 2:
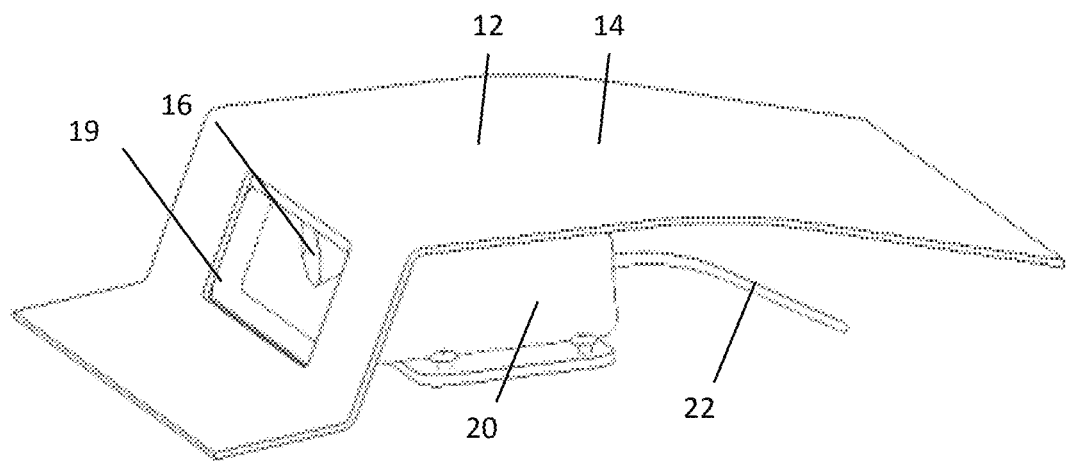
FIG. 2 shows a schematic view of a first arrangement of a transmitter and/or receiver apparatus as intended by the invention.
Figure 3:
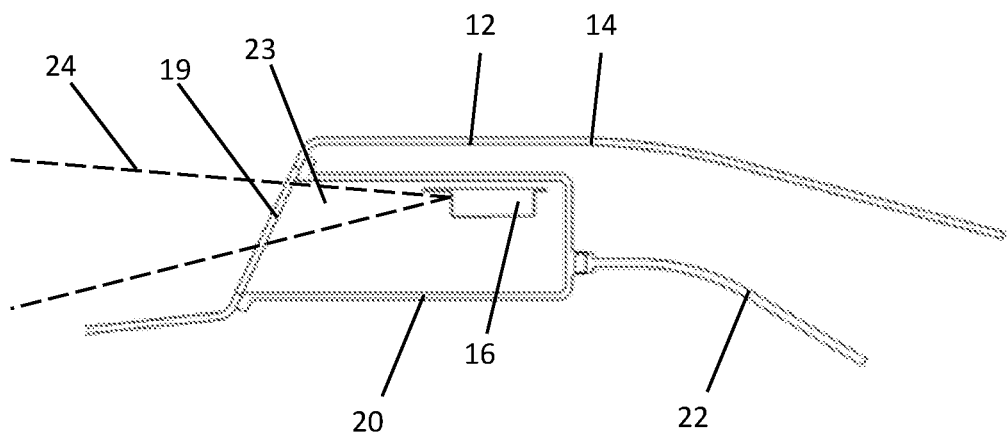
FIG. 3 shows a lateral view of the first arrangement of a transmitter and/or receiver apparatus as intended by the invention.

According to FIGS. 2 and 3, casing 20 can be a casing 20 which is connected to panel component 12, is free of walls in the direction of viewing area 19 and is disposed at and/or affixed to panel component 12 as a separate component. In (separate) casing 20, transmitter and/or receiver apparatus 16 is disposed so as to be spatially distanced from other components 21 of environment sensor 18 and is connected thereto via cable harness 22. FIG. 3 shows that electromagnetic and/or optical signals 24 are transmitted and/or received via a viewing area 19 and an air gap 23 available within casing 20 between viewing area 19 and at least one transmitter and/or receiver apparatus 16. Electromagnetic and/or optical signals 24 consequently do not have to pass through several viewing areas 19, as is the case in the state of the art shown in FIGS. 6 and 7. This leads to optical losses being reduced.

Figure 4:
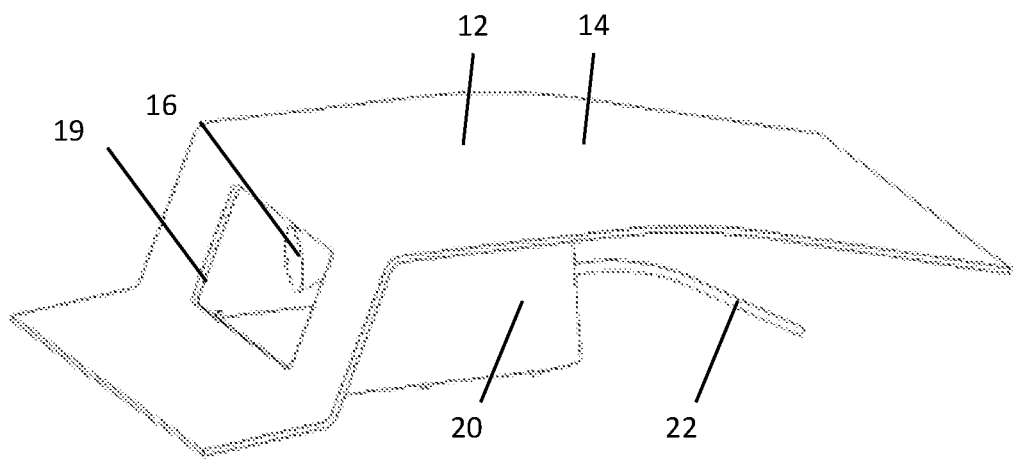
FIG. 4 shows a schematic view of a second arrangement of a transmitter and/or receiver apparatus as intended by the invention.
Figure 5:
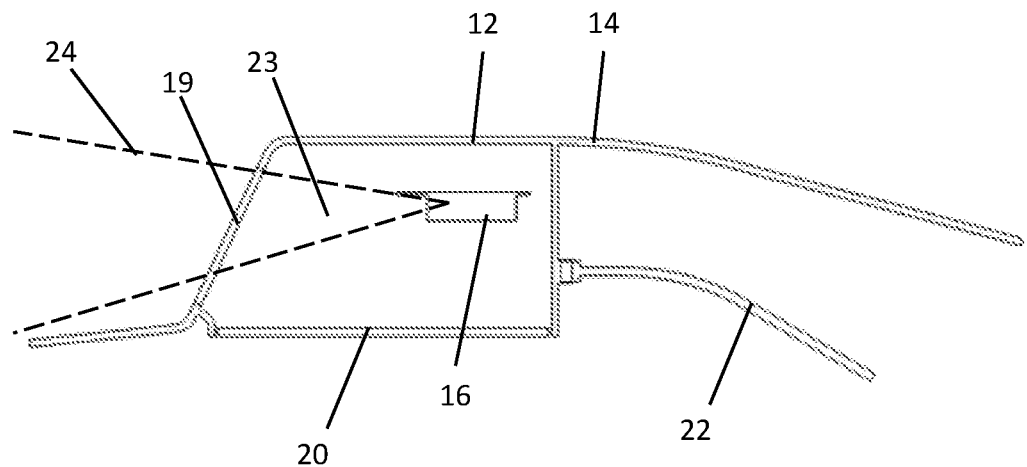
FIG. 5 shows a cut view of the second arrangement of a transmitter and/or receiver apparatus as intended by the invention.

In FIGS. 4 and 5, casing 20 is formed integrally with panel component 12. Casing 20 is therefore disposed in one piece at panel component 12 and does not have to be separately mounted thereon for this reason.

Figure 6:
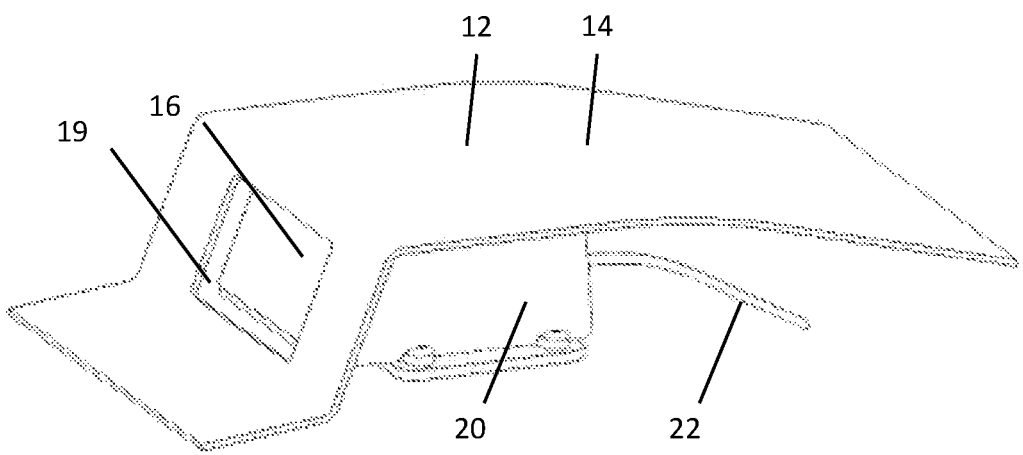
FIG. 6 shows a schematic view of a first arrangement of an environment sensor from the state of the art.
Figure 7:
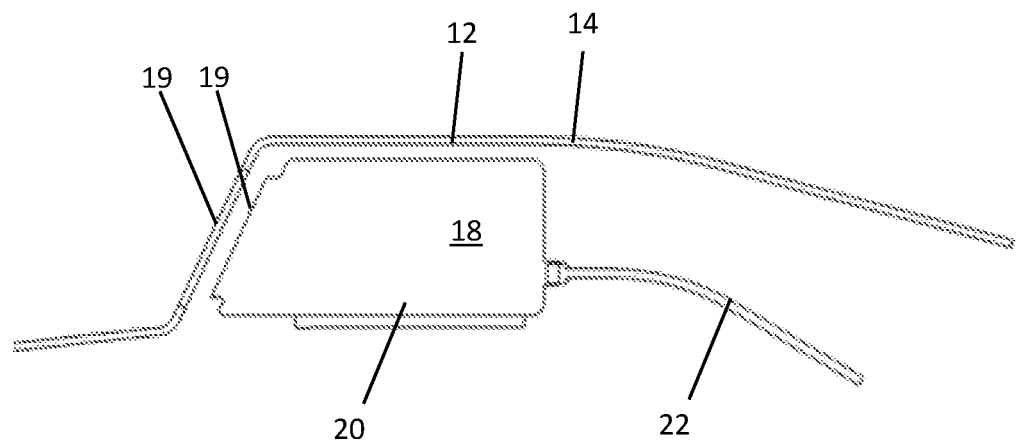
FIG. 7 shows a cut view of the first arrangement of the environment sensor from the state of the art.

FIGS. 6 to 9 refer to the embodiments of sensor arrangements from the state of the art. As can be seen in FIGS. 6 and 7, it is common in the state of the art for an environment sensor 18 to be disposed as a closed functional unit on roof module 10 in a separate, self-contained casing 20. For this purpose, casing 20 has its own viewing area 19, meaning environment sensor 18 has to look through two viewing areas 19 to chart the vehicle environment.

Figure 8:
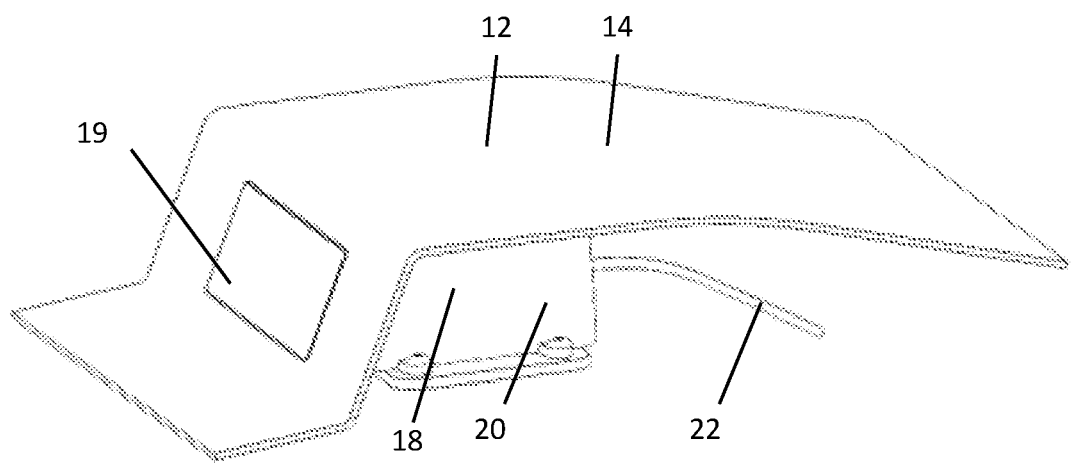
FIG. 8 shows a schematic view of a second arrangement of an environment sensor from the state of the art.
Figure 9:
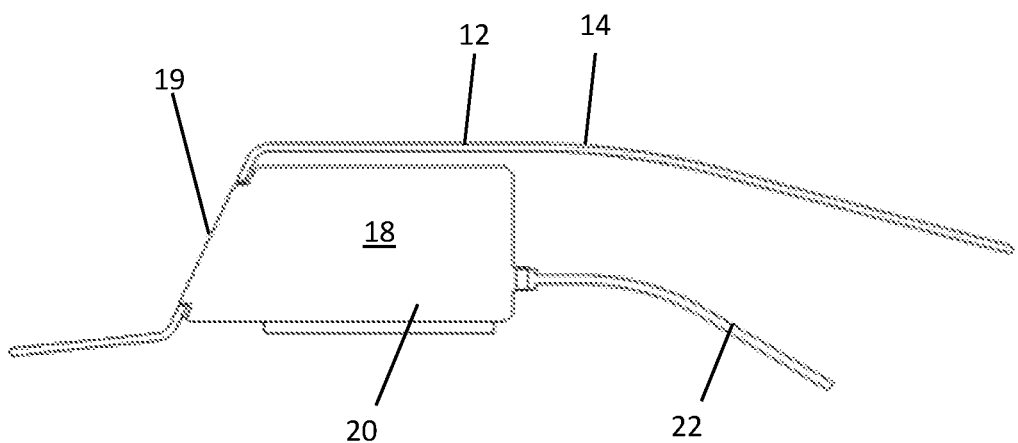
FIG. 9 shows a cut view of the second arrangement of an environment sensor from the state of the art.

As can be seen in FIGS. 8 and 9, an insertion solution is known from the state of the art, in which environment sensor 18 is inserted as a self-contained functional unit 18 into panel component 12 via an opening via a closed casing 20. In this instance, environment sensor 18 may only look through viewing area 19 of casing 20, however, there are problems in this case regarding the tightness, as a sealing of the opening is required.

The invention claimed is:

1. A roof module, comprising:
    a panel component which forms at least sections of a roof cladding of a vehicle roof, which functions as an outer sealing surface of the roof module, and has a viewing area,
    wherein at least one transmitter and/or receiver apparatus of an environment sensor is disposed in a casing free of walls in the direction of the viewing area and connected to the panel component and is configured to transmit and/or receive electromagnetic and/or optical signals via the viewing area and/or the panel component and an air gap between the viewing area and the at least one transmitter and/or receiver apparatus, and
    wherein the casing is connected to the panel component in one piece.

2. The roof module according to claim 1, wherein the viewing area is embedded and/or inserted in the panel component or is formed via the panel component and comprises at least one lens or at least one window.

3. The roof module according to claim 1, wherein the environment sensor comprises a lidar sensor and/or a radar sensor and/or a camera sensor and/or a multi-camera sensor and/or an ultrasonic sensor.

4. The roof module according to claim 1, wherein the roof module is disposed as a structural unit on a vehicle chassis.

5. A vehicle having a vehicle chassis on which a roof module according to claim 1.

6. The roof module according to claim 1, wherein the at least one transmitter and/or receiver apparatus comprises an image sensor.

7. The roof module according to claim 6, wherein the image sensor is a silicon sensor.

* * * * *